United States Patent [11] 3,575,439

| [72] | Inventor | Abbie M. Lusk |
| | | P.O. Box 7644, Riverside, Calif. 92503 |
| [21] | Appl. No. | 740,382 |
| [22] | Filed | June 26, 1968 |
| [45] | Patented | Apr. 20, 1971 |

[54] LOAD CONVEYING CART
4 Claims, 7 Drawing Figs.

[52] U.S. Cl. ............................................. 280/47.3, 280/78, 280/84
[51] Int. Cl. ............................................. B62b 1/10
[50] Field of Search ............................................. 280/47.3, 78, 84; 180/19

[56] References Cited
UNITED STATES PATENTS
| 2,509,824 | 5/1950 | Johnson | 280/78X |
| 2,567,423 | 9/1951 | Cleghorn | 180/19 |
| 2,918,296 | 12/1959 | Goodale | 280/47.3X |
| 2,979,338 | 4/1961 | Dwyer | 280/47.3 |

*Primary Examiner*—Leo Friaglia
*Assistant Examiner*—John A. Pekar
*Attorney*—John H. Crowe

ABSTRACT: A carrying cart useful for game animal retrieval purposes, and a winch useful for pulling the cart. The cart is of narrow, lightweight, open frame construction and has a detachable load basket supported at about waist height by an undercarriage. It rolls on a single wheel mounted at the center of an axle running the full width of the cart. The winch is attachable to the hub of a jacked-up drive wheel of an automobile where it operates coactively with the wheel hub to pull the loaded cart by means of a connecting cable.

Patented April 20, 1971 3,575,439
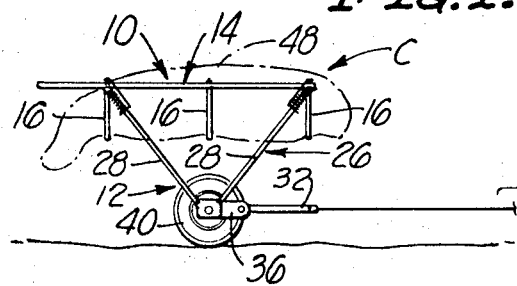
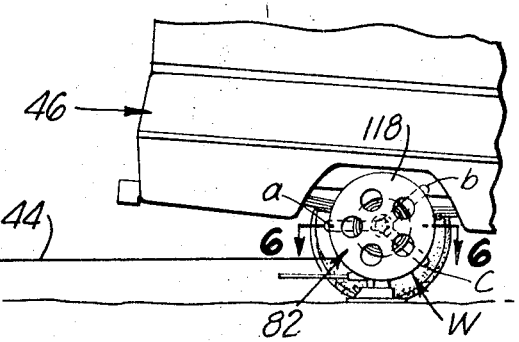
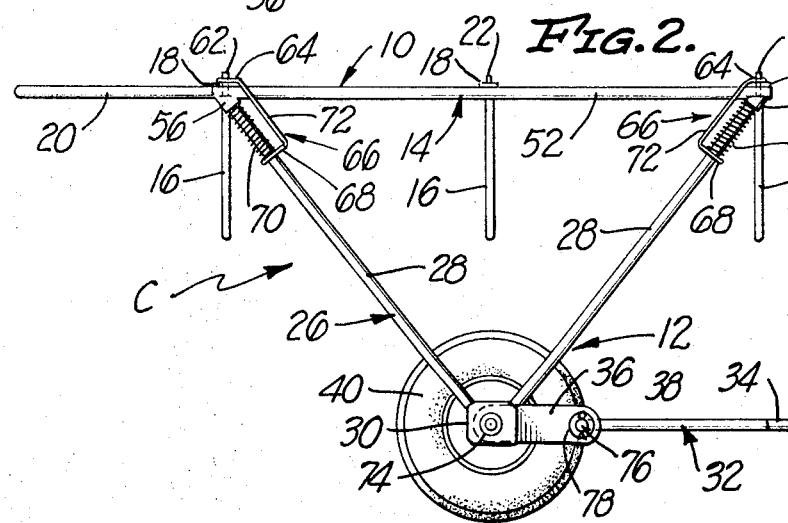
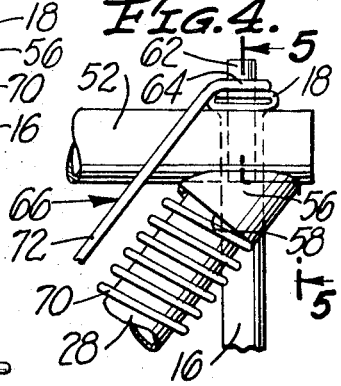
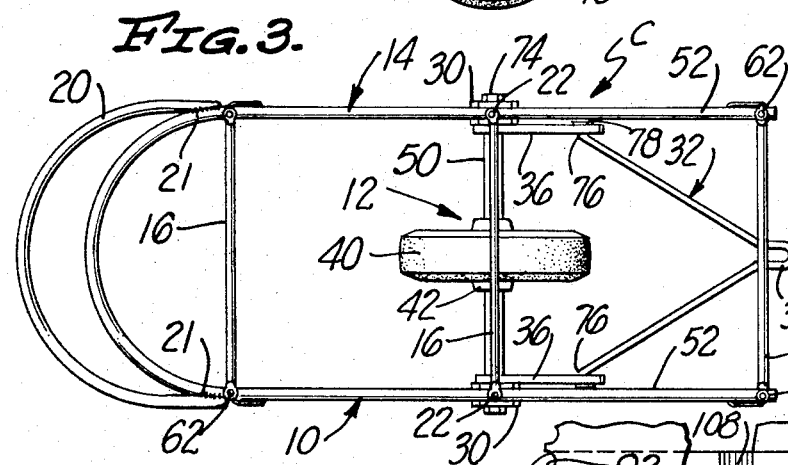
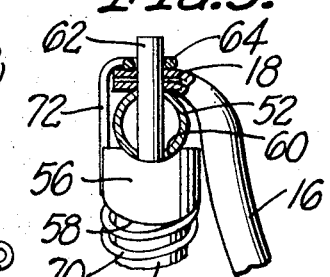
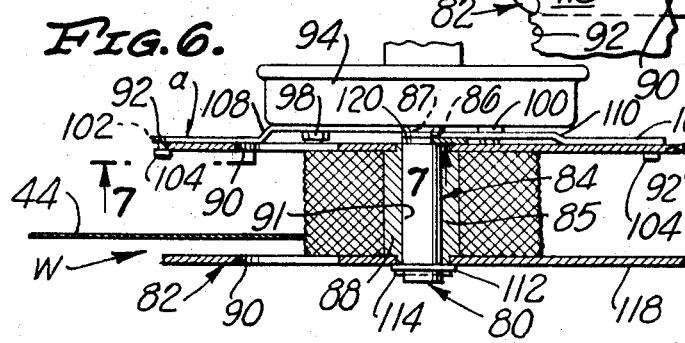
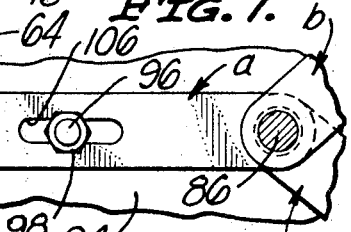
INVENTOR
ABBIE M. LUSK
BY
John H. Crowe
AGENT

LOAD CONVEYING CART

BACKGROUND OF THE INVENTION

This invention relates generally to lightweight and easily maneuverable cart means for the hauling of relatively heavy or unwieldy loads over difficultly accessible terrain, and more particularly to such means suitable for the retrieval of deer, or other relatively heavy game animal carcasses, from off-the-road hunting ground area to places where they can be loaded onto cars or trucks for transportation to dressing stations, freezing lockers, or equivalent destinations, with minimal effort.

Typically, hunters of relatively large game animals, such as deer, pursue their quarry in areas incompletely accessible to motor vehicles. Such a hunter will normally drive as far as he can into the area he intends to hunt, which is generally wooded, and oftentimes hilly or mountainous as well, then park his vehicle and proceed on foot to a likely hunting spot. This can be as a quarter or half mile, and in some cases even farther, from the vehicle, so that the hunter lucky enough to bag an animal is often faced with the difficult task of moving its dead weight a long way, through less than hospitable terrain, before he can load it onto his vehicle. At best, this poses a difficult challenge, particularly where the animal carcass is unusually heavy or bulky. Under less than ideal circumstances, such as, for example, where the trail between the place where the animal is brought down and the parked vehicle is winding, heavily wooded and uphill, the challenge can be more than enough to tax the strength, endurance and ingenuity of all but a team of skilled mountain rescue operators.

Insofar as I am aware, no one has yet come up with a very satisfactory solution to the hunter's problem of animal carcass removal from difficultly accessible areas. Consequently, those who hunt are still forced to use methods of brute force and native ingenuity similar to those relied upon by their earliest forbears to retrieve game from hard-to-reach places, particularly in mountainous regions. No type of wheeled cart, trailer, or other vehicle has heretofore, to my knowledge, proven satisfactory for the hauling of game through rough terrain, mostly because of inherent characteristics, common to the great majority of such devices, which render them unsuitable for this type of service. For example, practically every trailer or cart sturdy enough to hold a heavy animal carcass with which I am familiar is relatively heavy, bulky and cumbersome, and supported on two or more wheels, with all of the width and complexity of parts peculiar to that type of vehicular support system. No such vehicle is practical for use in a wooded area where its many protruding undercarriage, and other, parts, can easily become entangled with underbrush and low-growing shrubbery. Furthermore, this type of vehicle is invariably too heavy to be pulled by hand over difficult terrain, particularly where the ground is soft and/or the direction of pull is uphill, and no means of providing a satisfactory alternative power source for its cross-country movement has yet, to my knowledge, been proposed. In short, the difficult problem of game retrieval from isolated hunting ground areas inaccessible to motor vehicles remains essentially as unsolved today as it has always been in the past.

SUMMARY OF THE INVENTION

I have now, by the present invention, succeeded in furnishing carrying cart means uniquely capable of moving heavy game animal carcasses through difficultly accessible terrain to points where they can be conveniently loaded onto conventional motor vehicles for hauling to their places of ultimate destination. In its preferred form, the carrying cart means is designed for use in conjunction with a cooperating winch adapted for mounting on the hub of an automobile or trunk drive wheel in such a way as to derive its winding power from the turning hub. More specifically, the carrying cart means comprises, in its fully operational form (not its only form, as will be seen), a relatively narrow, lightweight cart, preferably with a detachable upper portion to make it easier to carry and store, having excellent maneuverability in wooded, or other, areas where many obstacles must be bypassed; narrow passageways between trees, rocks, etc., traversed; and difficulties of a like character met.

The aforesaid cart, sometimes hereinafter called a carrying cart, is uniquely designed to support a large game animal carcass and traverse rough ground under pulling inducement from the aforesaid winch with a minimum of handling difficulty. The cart differs from conventional hauling vehicles of the type previously referred to in being of relatively narrow, lightweight, open-frame construction, and in having, in its preferred form, a single wheel in the center of an elongate axle which runs the full width of its body. The wheel preferably has a pneumatic tire to render the cart more easily maneuverable in soft sand, mud, and the like. The carrying cart is no wider than necessary to receive the carcass of an animal lengthwise in its load-receiving area, this being defined by a basketlike frame of generally cradled cross-sectional character forming the upper portion of the cart. Being thus relatively narrow, and rolling on only one wheel, or, in some cases, the equivalent of one wheel, the cart is able to pass through narrow spaces between rocks, trees, and the like, as well as over rough ground, low-lying brush, etc., where the progress of a conventional hauling vehicle of the type referred to above would be completely impeded.

The aforesaid carrying cart is preferably made, for the most part, of tubular metal to give it lightness of weight and a minimum of structure to catch on tree branches, shrubbery, rocks, or the like with obvious cart-impeding consequences. A particularly unique feature of the carrying cart, in its preferred form, comprises spring-loaded means for holding the load-receiving, basketlike frame, referred to above, in place in the upper portion of the cart structure in such a way as to be readily detachable by hand therefrom, for convenience of cart storage, portability, etc.

My novel cart, in its preferred from, stands about waist high, and has a handle at the rear to permit a person walking therebehind to exercise stabilizing and guidance control over the moving cart with little difficulty. The elongate cart axle, referred to above, is sufficiently wide to prevent tipover of the moving cart to either side, and thereby substantially overcome the instability which would otherwise be present in such a one-wheeled vehicle. The carrying cart preferably has a V-shaped tongue projecting forwardly from drawbars affixed to said axle, near the ends of the latter, which swings up and down about points of pivotal connection with the drawbars. The tongue is positioned to permit effective pulling of the loaded cart by a cable attached to its vertex and connecting it with the aforesaid winch.

The preferred winch for pulling the carrying cart of this invention consists of a spindle assembly with movable arms designed for temporary installation on the hub of a motor vehicle drive wheel to provide an outwardly extending spindle for a cable-receiving reel, and a cooperating reel which fits onto the spindle and is detachably fastenable to the arms in such a way as to permit coactive rotation of the reel with the drive wheel hub. It is, of course, necessary to jack the drive wheel up, and expose its hub, before the winch can be installed for use thereon. The wheel hub lug bolts, and their cooperating nuts, are used to fasten the arms of the spindle assembly to the hub, the arms being positioned so that a lug bolt passes through an appropriately sized and located opening in each, and on eof said nuts then being drawn tight against each arm, to complete the necessary fastening operation.

As will be apparent, my novel carrying cart, by virtue of its one-wheeled mobility, narrowness, lightness of weight, and minimum of brush-entangling structural and other surfaces, is readily movable in places where no other known vehicle can go. Moreover, the aforesaid winch makes it possible to pull heavy loads with the cart through rugged terrain, under conditions where such haulage would otherwise be extremely difficult, if not impossible, such as, for example, where the going is uphill and the ground is slippery because of a heavy layer of pine needles, packed snow or ice, deep mud, or the like. The source of power for the winch is more than adequate for the purpose, and available to any hunter who has a truck or car at his disposal, since the winch can be made to fit a wheel hub of any size, or even wheel hubs of a variety of sizes. One or more pulleys can be employed, in conjunction with the winch cable, to help guide the cart around obstacles in its path when being pulled by the winch. As will be seen, the unique winch of this invention can be made to accommodate differing lengths of cable, up to and including such lengths consistent with relatively long distances of cart travel.

While, as indicated, the cart and winch combination of this invention is particularly useful for the removal of game animal carcasses from difficultly accessible hunting ground areas, its overall range of utility is not so limited. Thus, the cart and winch, or either one separately, can be employed for a variety of purposes other than the retrieval of game, including, for example, the hauling of relatively heavy objects other than animal carcasses from hard-to-reach spots in mountainous, or other rough, country.

It is thus a principal object of this invention to provide a carrying cart uniquely capable of hauling freshly killed game animal carcasses out of difficultly accessible areas with a minimum of control and effort on the part of the operator.

It is another object of the invention to provide such a cart of lightweight construction which can be easily assembled, and disassembled for carrying and storage purposes, without the use of tools.

It is yet another object of the invention to provide a winch capable of pulling the cart through difficult terrain which is readily attachable to, and operable from power supplied by, a motor vehicle drive wheel hub.

Other objects, features, and advantages of the invention will become apparent to those skilled in the art in the light of subsequent disclosures herein.

BRIEF DESCRIPTION OF THE DRAWING

FIG. 1 is an interrupted side view of a preferred embodiment of a carrying cart in accordance with this invention loaded with the carcass of a game animal and being pulled by a winch in accordance with the invention, the winch being shown mounted in operating position on the hub of a drive wheel of a jacked-up motor vehicle and the animal carcass being shown in phantom outline.

FIG. 2 is an enlarged side elevation of the FIG. 1 carrying cart.

FIG. 3 is a plan view of the FIG. 2 carrying cart.

FIG. 4 is an enlarged fragmentary view, in side elevation, of an important assembly of interlocking parts holding the carrying cart structure together at its upper right-hand corner as seen in FIG. 2.

FIG. 5 is another fragmentary view of the assembly of parts, taken partly in section along line 5–5 of FIG. 4.

FIG. 6 is an enlarged view of the winch and motor vehicle drive wheel hub on which it is mounted, taken mostly in section along line 6–6 of the FIG. 1.

FIG. 7 is a still further enlarged fragmentary view of the winch, taken along line 7–7 of FIG. 6, showing, in particular, one of three arms adapted to hold a cable-winding reel, forming an important part of the winch, to said drive wheel hub and illustrating the way in which this reel-holding function is accomplished.

DESCRIPTION OF THE PREFERRED EMBODIMENT

Considering now the drawing in greater detail, with particular emphasis first on FIG. 1, there are shown generally at C and W, respectively, a preferred embodiment of a carrying cart in accordance with this invention, and a cooperating winch attachable to the hub of a motor vehicle drive wheel in the manner shown. When so attached to a wheel hub, winch W is connectable to the cart through a cable 44, as shown, and operable through the driving controls of the motor vehicle on which the hub is installed, such a vehicle being shown fragmentarily at 46 in FIG. 1, to pull the loaded cart from an area inaccessible to said vehicle. To illustrate the manner in which the cart carries its load, such a load, in the form of an animal carcass, is shown in phantom line outline at 48 in FIG. 1.

Carrying cart C consists of a basketlike upper section 10, serving to receive the load to be carried by the cart and referred to hereinafter as bed frame 10, detachably secured to an undercarriage 12, in a manner presently to be described. The lower portion of the undercarriage comprises a pneumatically tired wheel 40, mounted at the center of an elongate axle 50. Except for the wheel and axle, and certain parts associated therewith which will hereinafter be described, the undercarriage and bed frame of the cart are constructed, for the most part, of metal tubing to assure lightness of weight and lack of structural complexity in the overall cart assembly. Bed frame 10 consists essentially of an elongate, U-shaped peripheral member 14 having a pair of parallel arms 52. The U-shaped member is positioned with its enclosed end to the rear, and its arms 52 pointing forwardly, relative to the direction of cart movement. As FIG. 3 best shows, U-shaped member 14 of the bed frame is positioned over wheel 40 so that the latter rolls directly under its longitudinal axis and in a direction substantially parallel with the axes of arms 52 when the cart is in motion under the pulling influence of winch W.

The arms of the U-shaped member are joined at their fore-and-aft ends, respectively, and in the middle, by three downwardly looping crosspieces 16, which serve as slinglike supports for a load carried by the cart, and impart a somewhat cradlelike cross-sectional character to the bed frame. By virtue of this construction, the bed frame is of extremely lightweight character and lacking in cumbersome bulkiness, yet sufficiently strong to firmly support and hold a heavy animal carcass in place when the carrying cart is being pulled across rough ground in the manner illustrated in FIG. 1. Each of the crosspieces 16 is of tubular metal construction and shaped at its ends into flat segments 18 which are bent outwardly, away from each other, so as to flatly overlie the arms of U-shaped member 14, in the assembled cart, as best illustrated in FIG. 5. Four upstanding pins 62 and two pins 22, positioned as hereinafter described, serve to hold the flattened end segments of crosspieces 16 in place over the arms of U-shaped member 14 in a way presently made clear.

Bed frame 10 has a C-shaped member 20 joined thereto by welding, or similar, means, as shown at 21 on FIG. 3, to provide a rearwardly extending handle for cart C. This handle, hereinafter referred to as handle 20, is, as will be seen, conveniently positioned to permit stabilizing control of the cart in motion, under the pulling influence of winch W, by a person walking behind it.

Supported by elongate axle 50, near its outer ends, are two trusses 26, designed and positioned to support the arms of the U-shaped member of bed frame 10 and form parallel, symmetrical side structures for the main body of the cart. Each of the trusses 26 consists of a pair of struts 28, of tubular metal construction, which angle upwardly from points of lower end adjacency near axle 50 to upper termini at the respective ends of an arm of U-shaped member 14 of the bed frame 10. At their lower ends, the struts 28 are tightly fitted into appropriately angled sockets in a hublike block 30 fixedly secured to axle 50 in a manner hereinafter to be described. The upper ends of struts 28 are each crowned by a tightly fitting cap 56, the lower rim of which forms a shoulder 58 around the strut and the upper portion of which is grooved in the manner illustrated in FIG. 5 to provide a mating seat 60 for an arm of U-shaped member 14.

Extending upwardly from the approximate center of the seat 60 groove of each of the caps 56 is a pin 62, previously mentioned of round cross section. The pin 62 is of sufficient length to extend upwardly through and beyond, an arm of the U-shpaed member 14, a flat end segment 18 of a crosspiece 16 and the upper eye 64 of a holdfast 66, hereinafter to be described in detail. To permit this interfitting relationship between the involved parts, the arms of the U-shaped member are provided with apertures of the proper size, shape and location to mate with the pins 62, and the flat end segments 18 of crosspieces 16 are provided with apertures which are likewise properly sized, shaped, and positioned to mate with the pins. This mating relationship between the pins and the bed frame members is best illustrated in FIGS. 4 and 5.

As previously indicated, bed frame 10 is detachably secured to undercarriage 12 of the cart in such a way as to permit easy disassembly of the cart, for carrying and storing purposes, without the use of tools. This is made possible by the presence of a plurality of substantially identical sets of fastening elements which cooperate to hold the ends of the arms of U-shaped member 14 and the capped upper ends of struts 28 of the trusses 26 together in the position illustrated in the drawing. Each of these sets consists of a spiral compression spring 70, a holdfast 66 and one of the caps 56, previously described. The spiral compression springs 70 are each sized to fit loosely around one of the struts 28 and abut, at one end, the shoulder 58 formed by the lower edge of the cap 56 on that strut. Each of the holdfasts 66 consists of a section of rod shaped at its lower end into a first, or lower, eye 68, and at its upper end into a second, or upper, eye 64. It has a relatively long shank 72 between the eyes at its lower and upper ends, respectively, and is bent through an angle of about 90°, as viewed in side elevation, between the bottom of its shank 72 and lower eye 68. At its upper end, the holdfast is bent at an obtuse angle near its upper eye 64 to permit that eye to fit flatly on top of a flat end segment 18 of a crosspiece 16 when the holdfast is disposed in a locking position, soon to be described, in which it serves to hold bed frame 10 and undercarriage 12 together.

As should now be apparent from the drawing, and particularly FIGS. 2 and 4, bed frame 10 is made detachably secure to undercarriage 12 of cart C by first positioning it so that the pins 62 on caps 56 pass respectively upwardly through the receptive openings in arms 52 of U-shaped member 14 therefor, then fitting two of the crosspieces 16 in place at the ends of the arms of the U-shaped member so that the pins pass through the aforesaid apertures in their flat end segments 18, and, finally, urging each of the holdfasts 66 upwardly against the downward force of one of the springs 70 in compression until its upper eye 64 clears the top of the pin 62 of a cooperating cap 56 and slipping that eye down around the pin When this procedure has been completed, each end of the two arms of U-shaped member 14 is held firmly against the cap on the upper end of one of the struts 28 by the downward force of the spring 70 encircling that strut on the lower eye of a cooperating holdfast which force is transmitted to the upper eye of the holdfast to cause it to bear downwardly on the top of the flat segment 18 of a cooperating crosspiece overlying the top of the arm resting on said cap.

The spiral compression springs 70 and holdfasts 66 are properly dimensioned to provide the necessary force to hold the cart structure together at the four above-identified juncture points, yet permit easy assembly and disassembly of the bed frame and undercarriage parts of the cart by hand and without the use of tools. While the middle one of the three crosspieces 16 is physically similar to the other two, there are no fastening means for holding its flattened ends in place in the cart structure similarly to the way the ends of the latter are held. Instead, the flat end segments of the middle crosspiece are fitted onto the pins 22 upstanding from the arms of the U-shaped member of bed frame 10, so that the pins pass through the previously mentioned apertures therein (the pins being, of course, properly sized to permit this), and are held in place by the weight of the load in the cart when the latter is in use as taught herein. This weight, incidentally, also helps to hold the two end crosspieces in place and augments the down-bearing force of the springs 70 on bed frame 10, thereby contributing to increased structural rigidity in the loaded cart. In this connection, crosspieces 16, as will now be evident, serve, in addition to their load carrying function, to brace against part of the cart structure against wobbling and twisting deformation and thus impart a good measure of strength and rigidity thereto.

While carrying cart C can, of course, vary in size within the scope of this invention, its preferred dimensions, as presently contemplated, correspond to an overall length of about 5 feet, a height of about 3 feet and width of about 2 feet, since a cart with these measurements can be controlled with little difficulty by a person walking behind it as it is being pulled, under load, by winch W. Wheel 40 is preferably fitted with bearings of either the ball or roller type, and with a tire of readily available size, such as, for example, 800–4, so that replacements can be easily obtained when needed. The wheel is maintained in its proper place of rotation at the center of axle 50 by any means known to be suitable for this purpose examples of such means being sufficiently familiar to those skilled in the art to require no description here.

Elongate axle 50 is of reduced diameter from either end to a pair of shoulders spaced equidistantly therefrom, and is threaded from both ends to receive a pair of nuts 74, for a purpose hereinafter appearing. A pair of relatively flat drawbars 36 are apertured in their aft ends to fit snugly around the reduced portions of axle 50 and come flush against the aforesaid shoulders, in the manner best illustrated in FIG. 3. The components of the lower part of undercarriage 12, including the aforesaid wheel and axle and parts associated therewith are assembled with the two drawbars 36 fitted onto the reduced ends of the axle to flushness of their facing walls with the above-mentioned shoulders and in forwardly pointing orientation, as illustrated in FIGS. 2 and 3 of the drawing. The two hublike blocks 30, which, as previously noted, hold the struts 28 together at their lower ends, are mounted on the reduced end portions of the axle, with the latter passing through properly sized apertures therein, and positioned with their facing surfaces flush against the outer walls of drawbars 36. The two nuts 74 are screwed onto the threaded end portions of the axle to tightness against the hublike blocks 30 to hold the assembled parts rigidly together.

A tongue 32 is fastened to drawbars 36, to complete the cart assembly. Tongue 32 is a section of metal rod bent into a generally V-shaped configuration, but having a bight segment 34 where the arms of the V come together, and out-turned segments 76 at the outer ends of those arms. The drawbars 36 have penetrative openings in their forward ends, sized to admit the out-turned segments 76 of the tongue loosely enough to permit the latter to swing up and down about the pivot points thus formed between the tongue and drawbars. The tongue is positioned for use in the cart structure with the out-turned segments 76 of its arms passing through the aforesaid openings in drawbars 36, a pair of washers 78 slipped over the outer end of the out-turned segments of the tongue arms to flushness with the outer sides of said drawbars, and a pair of cotter pins 38 passing through the ends of the arms outboard of the washers, openings being, of course, provided in the tongue arms for accommodation of the cotter pins.

Winch W consists of a spindle assembly 80 and a cable-receiving reel 82, adapted to fit together and otherwise cooperate for purposes of this invention in the manner hereinafter described. Spindle assembly 80 consists, in turn, of a spindle means 84 having a spindle segment 85 sized to receive the reel 82 and a reduced end segment 86 adapted to serve as a pivot for three arm members a, b and c, shown in positions of angular dispersion therearound in the drawing, and particularly FIG. 1. Arm members a, b and c are of strap metal construction and of equivalent length, although they differ in certain features, as will presently be discussed. The arm members (or arms as they will sometimes hereinafter be called) have penetrating openings at their inner ends which permit them to fit pivotally, in axially adjacent positions, on the reduced end segment 86 of spindle means 84, all illustrated in FIG. 6. The terminal end of the reduced end segment of spindle means 84 is flared, as shown in phantom lines at 87 in FIG. 6, to prevent the escape of arm a, pivoted at that end of the segment, from the spindle means. The sizes of the penetrating openings in the arms, and the arm thickness, are adjusted to permit independent pivoting of each arm about the spindle means yet allow the parts of the spindle assembly to remain in sufficiently tight working order for use in the manner hereinafter disclosed.

Each of the arms a, b and c has a slot 106 of sufficient length and width, and spaced properly thereon, to admit a separate lug bolt on any of variously sized motor vehicle drive wheel hubs when the spindle assembly is fitted against the hub with the terminal end of reduced segment 86 of spindle means 84 at the hub center and its arms extending radially outwardly from the spindle means so that the axes of their slots are in alignment with three of the lug bolts of the hubs. This manner of fitting the spindle assembly to the hub of a motor vehicle drive wheel is the first step in securing winch W to such a hub for operation in the above indicated manner, and is preferably carried out in a way to assure separation of the arms of the spindle assembly by relatively wide angles, such as illustrated in FIG. 1, around the hub. After the spindle assembly has been thus fitted to a wheel hub, it is secured in place by a firm tightening of their cooperating nuts on these lug bolts passing through the arms of the assembly against the outer sides of the arms. The spindle assembly is now fastened firmly enough to the hub to rotate coactively therewith under driving actuation of the latter.

Needless to say, the arm slots 106, while wide enough to freely admit the aforesaid lug bolts, are sufficiently narrow to provide arm surface on either side of penetrating lug bolts against which the lug bolt nuts can be tightened to lock the spindle assembly against a wheel hub in the above-described manner. This preliminary step for securing winch W to a motor vehicle drive wheel hub is, in a sense, illustrated in FIGS. 1, 6 and 7 of the drawing, which show the spindle assembly fastened to the previously mentioned motor vehicle drive wheel hub (designated by the numeral 94) in the manner just described, an involved lug bolt and nut being shown at 96 and 98, respectively. Since, as previously explained, the inner ends of arms a, b and c are axially offset along the reduced end segment of spindle means 84, it is necessary to position spacer washers around the lug bolts penetrating arms b and c thick enough to assure outward spacing of those arms from the wheel hub the proper distances to compensate for the axial offsets of their inner ends from that end of the spindle means adjacent the wheel hub. The spacer washer for arm c can be seen at 100 in FIG. 6.

Reel 82 of the winch has a hub 88 with a central bore 91 sized to receive the spindle segment 85 of spindle means 84 in bearing-journal relationship and permit the reel to rotate freely around the spindle means when positioned thereon as hereinafter described. The reel also has inner and outer walls 116 and 118, respectively, of generally round periphery, so designated because the former is positioned inwardly, adjacent the arms of the spindle assembly, when the winch is assembled for use on a wheel hub. The final steps of mounting the winch on such a wheel hub, after spindle assembly 80 has been attached to the hub in the above-described manner, are accomplished by aligning the bore 91 of the reel with the spindle segment of spindle means 84, pushing the reel onto the spindle segment until its inner wall 116 makes contact with the arms of the spindle assembly, and then fastening the reel to the spindle assembly in a manner presently to be described.

Each of the inner and outer walls of reel 82 has a plurality of circular openings 90 spaced equidistantly from, and around, the axis of the reel. These openings are of equivalent size, and centered on the circumference of a circle concentric to the reel wall faces. The openings, which are shown in both of the walls of reel 82 for purposes of better reel balance and appearance, could actually be provided only in the inner reel wall, since their primary purpose is to provide clearance for the outwardly projecting lug bolts of the wheel hub on which the winch is installed when the reel is pushed to its final position on spindle means 84 in the above-described manner. The necessity for such openings to accommodate the aforesaid lug bolts, as well, incidentally, as the lug bolt nuts tightened against arms b and c of the spindle assembly, is illustrated in FIG. 6 of the drawing, which shows certain lug bolt and nut segments projecting into the space afforded thereby.

For reasons which will soon be evident, it is essential that arms a, b and c present coplanar surfaces of abutment for the inner wall of reel 82 when the latter is pushed inwardly on the spindle segment of spindle means 84 to contact with those arms in the above-described manner. Since, as previously emphasized, the arms a, b and c are axially displaced at their inner, pivoted ends along the reduced end segment of spindle means 84, these coplanar surfaces of abutment are provided by means of offset bends 108 and 110 in arms a and c, respectively, of sufficient magnitude to bring portions of the outer faces of those arms into coplanar relationship with the outer face of arm b. Arm b, as will be apparent from the drawing, requires no such offset bend since its inner end is positioned adjacent a shoulder 120 on spindle means 84 which divides the reduced end and spindle segments of said spindle means. As a result of this positioning of the inner end of arm b, all of its outer face, for a distance equal to the radius of the inner wall of the reel from the reel hub center, is available for contact by the reel when it is fully seated on the spindle segment of spindle means 84, hence serves as the norm to which the aforesaid portions of the outer faces of arms a and c must be brought to achieve the necessary coplanar relationship of the arms described above.

Spaced equidistantly around the outer edge of inner wall 116 of reel 82 are a plurality of indentations 92 of equal size and shape. Each of the arms a, b and c of spindle assembly 80 has a tapped opening 102 adapted to receive a bolt 104 with an enlarged head in threaded engagement. The indentations 92 on the inner reel wall and the tapped openings 102 in arms a, b and c are sized and positioned to permit their alignment through adjustment of reel 82 when the latter is pushed to contact with said arms on the spindle segment of spindle means 84 in the above-described manner; to receive bolts 104, when so aligned, with the shafts of the latter disposed in the indentations thus in line with said openings; and to thereafter permit tightening of the bolts 104 to flushness of their enlarged heads with portions of the inner wall of the reel adjacent said indentations, and locking of the reel firmly in place against said arms. The above-described procedure for fastening the reel 82 to the spindle assembly arms constitutes the final phase of the overall winch installation technique of this invention, after which winch W is firmly secured to the motor vehicle drive wheel hub for coactive rotation therewith and cart pulling functionality in accordance with the objects of this invention.

As previously indicated, it is, of course, necessary to first remove the wheel from a motor vehicle drive wheel hub before winch W can be mounted thereon as taught herein. This is a simple matter, however, of merely jacking up the vehicle and removing the wheel to expose the hub in the conventional way. The motor vehicle is left in the jacked-up position for installation of the winch, as FIG. 1 makes clear in its illustration of motor vehicle 46, which is shown jacked up, with winch W mounted, and operating, on one of its drive wheel hubs. The winch is preferably operated so as to receive incoming cable at the bottom, in the manner illustrated in FIG. 1. The reason for this is to minimize the possibility of cable contact with the frame or rear bumper of the motor vehicle. Where circumstances permit, however, as for example might be true when short lengths of cable are employed and/or the winch is mounted on a vehicle designed to ride high off the ground, the winch can be operated so as to receive such cable at the top.

It will be apparent from the foregoing that the winch and carrying cart of this invention can be easily carried, in partially disassembled form, in a pickup truck, jeep, or any other motor vehicle of a type suitable for hunting or camping use, and made ready for service with a minimum of difficulty and little more effort than required to change a flat tire. Thus, when the motor vehicle is driven as close as possible to the location of a game animal carcass, and the winch installed on one of its drive wheels in the above-described manner, it is only necessary to fasten the bed frame and undercarriage of the cart together, tie the front end of the cable to the cart tongue (at the bight, if the tongue is shaped like tongue 32 of cart C), then wheel the cart to that location and load the animal carcass into it.

Following the above-described procedure, the loaded cart is pulled to the motor vehicle on which the winch is installed, by operating the drive wheels of the vehicle to power the winch. The animal carcass can then be transferred from the cart to the vehicle with the least amount of difficulty. As previously noted, one or more pulleys can be positioned along the route of cart travel to help guide the cart around any obstacles in its path. After the cart has served its hauling purpose, and been unloaded, it is a simple matter to detach the bed frame therefrom, remove the winch from the motor vehicle drive wheel on which it is installed, and stow the cart and winch parts in said vehicle, where they can be left until needed again, or until removed to a more convenient place of temporary storage.

While reel 82, when installed as a functioning part of winch W in the above-described manner, will normally remain in place during operation of the winch, a washer 112 and cooperating cotter pin 114 can be provided for use at the outer end of the spindle segment of spindle means 84, in the positions indicated in FIG. 6, to insure against a accidental migration of the reel from the spindle segment under emergency conditions of winch use. A receptive hole for cotter pin 114 is, of course, provided in the outer end of the spindle segment where use of the pin in this fashion is contemplated.

The present invention has been described in considerable detail in order to comply with Pat. law requirements for a full public disclosure of at least one of its embodiments. Such detailed disclosure is not, however, intended to limit the scope of the Pat. monopoly sought to be granted to its particular confines Accordingly, while my novel cart and winch combination has been herein illustrated and described in what are conceived to be preferred and practical forms, it is emphasized that departures may be made therefrom within the scope of my invention. Certain of these departures have already been mentioned, and others will occur to those skilled in the art in the light of present teachings. Exemplary of the latter are noncritical variations of the shapes of various parts of the aforesaid cart and/or winch; the elimination of certain structural, or other, features of either the cart or the winch not critically essential to proper use and functioning thereof; the addition of useful, but noncritical, accessories to the cart and/or winch; etc. More specific examples of such modifications include the substitution for reel 82 of a reel having both its inner and outer walls indented around their outer peripheries; the substitution of spindle assembly arms for arms $a$, $b$ and $c$ which have round openings in lieu of the slots 106 in the latter and are limited to use on wheel hubs of one particular size; etc. Dozens of such modifications could be enumerated, but the foregoing examples are believed adequately illustrative for the intended purpose.

It goes without saying that the novel winch, as well as the carrying cart, of this invention, can vary in size within the scope of the invention. Where the carrying cart is of a size substantially consistent with the preferred cart dimensions given above (5 feet long by 3 feet high by 2 feet wide), and substantially similar in structural design to cart C of the drawing, it si preferred that its parts corresponding to struts 28 and the U-shaped bed frame member 14 of cart C, as well as that member corresponding to C-shaped handle 20, be constructed of metal tubing of about 1-inch diameter, and that the crosspiece members corresponding to crosspieces 16 be made of about ½-inch-diameter metal tubing. The C-shaped handle member of such a carrying cart is preferably spaced from the enclosed end of the U-shaped bed frame member of the cart by about 6 inches at the point of greatest distance therebetween.

The tongue, drawbars and axle of the carrying cart of this invention are preferably of steel construction. A cable of about ⅛-inch diameter represents the preferred cable size presently contemplated for use with my novel winch because a substantial length of such relatively thin cable can be wound onto the winch reel to increase the range of cart travel distance from the motor vehicle on which the winch is installed for use. The term motor vehicle is employed throughout this specification, and in the claims to follow, in its commonly accepted meaning, that is to denote any type of automobile, truck, or the like, having a drive wheel hub on which may novel winch can be mounted for service in the manner taught herein.

The cable-receiving reel component of my novel winch has built-in anchoring means to hold the inner end of a cooperating cable and permit use of the winch in accordance with present teachings. The anchoring means can be of any conventional type, many of which are well known to those skilled in the art, and therefore requires no specific illustration or detailed description herein.

It is emphasized, in final summary, that the scope of my invention extends to all variant forms thereof encompassed by the language of the following claims.

I claim:

1. Relatively narrow, lightweight carrying cart means comprising, as integrable structural elements of a cart with a load-receiving bed frame capable of rolling movement along the ground under pulling force:
    load-receiving bed frame means shaped to define an elongate load-receiving area of generally cradle shaped cross-sectional character, rolling support means, structural means adapted to hold said bed frame means above said rolling support means and tongue means cooperative with winch and cable means to permit cross-country pulling of the cart by the winch;
    said rolling support means comprising an elongate axle and wheel means, the wheel means being mounted on the axle to rotate around the approximate center, and substantially inboard each end, of the latter;
    said structural means being supported, in said cart, by said axle at points spaced relatively far from either side of said wheel means and near the outer ends of said axle, serving to hold said load-receiving bed frame means substantially directly above said wheel means so that the longitudinal axis of alignment of bed frame means falls on the plane of vertical bisection of the wheel means in the direction of alignment of the latter, and forming substantially parallel sides for said cart;
    said tongue means being connected to said elongate axle of said cart so that pulling force from said winch and cable means is exerted on the axle through the tongue means to achieve said cross-country pulling of said cart; and
    said elongate axle and wheel means being cooperatively sized to permit an end of the axle to contact the ground, should the cart tip to one side, before the angle of tip becomes great enough to create a serious danger of cart overturn to that side, whereby the possibility of lateral cart tipover is minimized.

2. Carrying cart means in accordance with claim 1 in which:
    said tongue means comprises drawbar means positionally secured to said elongate axle so as to extend away therefrom, in the direction of forward movement of the cart, and a tongue pivotally mounted on said drawbar means so as to extend forwardly from, and swing up and down about, the latter;
    said wheel means comprises a single wheel; and said structural means comprises a pair of trusses, each, in turn, comprising at least two struts and cooperating means for holding the lower ends of these struts in place adjacent said elongate axle so that they diverge upwardly away from the axle;

said carrying cart means including fastening means for detachably securing said load-receiving bed frame means to said structural means to permit the cart to be alternately assembled and partially disassembled, for storing and carrying purposes, with relative ease; and all parts of said carrying cart means cooperating in the structured of the assembled cart to support the load-receiving bed frame between the upper portions of the trusses forming the sides of said cart.

3. Carrying cart means in accordance with claim 2 in which said load-receiving bed frame means comprises a U-shaped peripheral member having a pair of parallel arms pierced by a plurality of openings, and a plurality of curving crosspieces adapted to bridge the space between said arms, lend rigidity to the cart structure and provide downwardly looping bands for the slinglike support of loads in the load-receiving bed frame area of said cart;

the struts forming the trusses comprising said structural means are of round cross section and have caps fitted on their upper ends, said caps having rims shaped to provide shoulders around the struts when so fitted and being otherwise shaped to provide seats for the arms of the U-shaped peripheral member of said load-receiving bed frame means when the latter is positioned for use in said cart, and said caps, additionally, having integral pins which project upwardly from said seats in the cart structure, the subject parts being designed to fit together with the arms of said U-shaped peripheral member resting in the seats provided by the caps on the upper ends of said struts and said pins passing upwardly through said openings in the arms of that member to termination thereabove; and said fastening means for detachably securing the load-receiving bed frame means to said structural means comprises a plurality of spiral compression springs disposed respectively around said struts and a plurality of holdfasts for transmitting pressing force from the springs to said load-receiving bed frame means to hold the latter in place in the cart structure;

said spiral compression springs being sized to fit loosely around said struts and respectively abut the shoulders formed by the rims of the caps on the struts when urged upwardly along said struts to adjacency with said rims, and said holdfasts comprising elongate sections of rod bent near, and formed into an eye at, each end;

each of said struts being threaded through an eye at one end of a separate one of the holdfasts and the involved parts being geometrically and positionally cooperative to permit the eye at the other end of the holdfast to be placed around the upwardly projecting end of a separate one of the integral pins of the caps on the upper ends of said struts, when the U-shaped peripheral member of said load-receiving bed frame means is resting on the seats provided by said caps, and held in downwardly pressing relationship with an arm of said U-shaped peripheral member by a cooperating one of said spiral compression springs caught in compression between the holdfast eye around the strut threaded through that spring and the shoulder formed by the rim of the cap on the upper end of said strut, as a result of which the load-receiving bed frame means is held firmly in position on the structural means of said cart, but can be readily detached from the cart by an urging of each of said holdfasts against the force of its cooperating compression spring until the eye at its upwardly disposed end is moved up and out of engagement with the pin on the cap at the upper end of its cooperating strut.

4. Carrying cart means in accordance with claim 3 characterized in that said cart has particular applicability for the removal of relatively large game animal carcasses from areas inaccessible to motor vehicle travel, the arms of the U-shaped peripheral member of said load-receiving bed frame means point in the direction of forward movement of the cart, said U-shaped peripheral member has a C-shaped handle affixed to its enclosed end to permit hand control of the cart by a person walking behind it as it moves ahead under load, and the height of said cart is commensurate with such hand control by said person walking in a substantially upright position;

said crosspieces adapted to bridge the space between the arms of said U-shaped peripheral member are three in number and spaced evenly apart along the length of said arms in said cart structure, have flattened ends with penetrating openings adapted to overlie said arms in said cart structure, and are installed for use in the cart structure with two disposed at substantially the fore and aft ends, respectively, of said arms so that their flattened ends overlie the arms and said integral pins of the caps fitted on the upper ends of said struts project upwardly through the penetrating openings therein, thus two crosspieces being held in their positions in the cart structure by the upper eyes of said holdfasts positioned around the upper ends of said integral pins passing through the penetrating openings in their flattened ends and bearing downwardly on those ends under the influence, in each case, of force transmitted thereto from a cooperating one of said spiral compression springs;

the struts of said trusses and said crosspieces are of tubular metal construction; and said wheel is fitted with a pneumatic tire to render the cart more readily movable over soft ground or other difficultly traversable terrain.